United States Patent
Pray et al.

[11] 3,870,195
[45] Mar. 11, 1975

[54] APPARATUS FOR AND METHOD OF FEEDING BOBBIN TUBES

[75] Inventors: Lester W. Pray; Gordon C. Anderson, both of Clemson, S.C.

[73] Assignee: Saco-Lowell Corporation, Easley, S.C.

[22] Filed: Apr. 26, 1973

[21] Appl. No.: 354,847

[52] U.S. Cl. .................. 221/225, 221/238, 221/292
[58] Field of Search .......... 221/156, 224, 225, 233, 221/234, 235, 236, 238, 251, 264, 290, 292, 293, 289; 74/665 H

[56] References Cited
UNITED STATES PATENTS
3,379,048  4/1968  Cooper et al. .................. 221/293 X Primary Examiner—Robert B. Reeves
Assistant Examiner—Joseph J. Rolla
Attorney, Agent, or Firm—Joseph H. Heard

[57] ABSTRACT

First and second transport devices respectively transport unoriented bobbin tubes from a supply source to an orienting device and oriented bobbins from the orienting device to a loading station at which they are deposited upon pegs of a conveyor movable thereby. The transport devices are driven relatively rapidly in out-of-phase relationship to each other, such that as one of the transport devices is moved to the orienting device, the other transport device is moved away therefrom. A platform-like retaining member restrains discharge of bobbins from the orienting device except when the second transport device is in a position to receive the same and an improved bobbin-support member associated with the first transport device facilitates proper transporting of bobbins from the supply source to the orienting device.

13 Claims, 5 Drawing Figures

APPARATUS FOR AND METHOD OF FEEDING BOBBIN TUBES

BACKGROUND OF THE INVENTION

This invention relates to bobbin feeding methods and apparatus of the general type or types disclosed in commonly-assigned U.S. Pat. Nos. 3,531,016, 3,601,283, 3,603,440 and 3,698,536. Such apparatus is particularly, but not necessarily exclusively, adapted for use in association with automatic doffers for textile spinning machines. The apparatus includes first bobbin transporting means movable between a bobbin-supply source and a generally funnel-shaped orienting device for conducting unoriented bobbins, one at a time and while extending generally horizontally, from the supply source to the upper end of the orienting device. The bobbins descend by gravity through the orienting device and are oriented by and discharged from it in an upright condition with their base ends lowermost. Oriented bobbins discharged from the outlet of the orienting device are transported therefrom, one at a time and while maintaining their aforesaid upright condition, by second bobbin-transporting means movable between the outlet of the orienting device and a loading station distal from such device and adjacent the path of travel of a belt-type conveyor having upstanding bobbin-receiving pegs thereon. Bobbins transported to the loading station by the second transporting means are received upon pegs of the conveyor and conveyed by it longitudinally of the spinning machine serviced by the automatic doffer with which the apparatus is associated.

The performance of a complete bobbin loading operation by the aforesaid apparatus, as heretofore constructed, required considerable time to complete. This has been due in part to the fact that the time required for gravity passage of the bobbins through the orienting device of the apparatus is not constant, and may vary considerably from bobbin to bobbin. To compensate for this variable factor and insure that each bobbin discharged from the orienting device will be received by the second transporting means, the drive means of the prior apparatus had been so designed as to move both of the transporting means substantially simultaneously to the orienting device, and thereafter move them, again substantially simultaneously, away from the orienting device only upon expiration of the maximum period of time required for passage of a bobbin through the orienting device. During each cycle of operation, therefore, the second transporting means would be maintained stationary adjacent the orienting device for an extended period of time, of longer duration than that required for a bobbin to normally pass through the orienting device, which in turn required that the whole bobbin-loading operation proceed at a relatively slow rate.

Another factor limiting the speed and/or affecting the reliability of operation of the prior apparatus was found to exist in connection with the transporting of bobbins from the supply source to the orienting device by the first transporting means. While being transported from the supply source to the orienting device, each bobbin was supported by and moved transversely across a stationary supporting surface. Frictional engagement between the stationary supporting surface and the bobbin being transported thereacross would at times produce erratic rotational and/or other movement of the bobbin. Such erratic bobbin movements would tend to cause jamming or other malfunctioning of the apparatus, particularly at higher operational speeds.

OBJECTS OF THE INVENTION

A primary object of this invention is the provision of a bobbin feeding method and apparatus characterized by improved efficiency and reliability, and permitting high speed and trouble free operation.

A related and more specific object is the provision of a bobbin feeding method and apparatus wherein the first and second transporting means for respectively transporting bobbins to and from the orienting device are driven in out-of-phase relationship to one another, such that as one transporting means is moved to the orienting device the other transporting means is moved away therefrom; and wherein platform-like retaining means prevents discharge of a bobbin from the orienting device except when the second transporting means is in a bobbin-receiving position adjacent the orienting device.

Another related and more specific object is the provision of a bobbin feeding apparatus wherein the means employed for transporting bobbins from the supply source to the orienting device is so constructed and designed as to greatly reduce if not altogether obviate the likelihood of erratic movement being imparted to the bobbins, even at relatively great operational speeds.

Still another object is the provision in an apparatus of the type described of improved drive means for imparting synchronous uniform movement to the first and second bobbin transporting means and to the bobbin conveyor component of the apparatus.

SUMMARY OF THE INVENTION

The present invention provides an improved bobbin feeding apparatus, generally of the type described, which includes drive means for moving the first and second bobbin-transporting means to and away from the orienting device of the apparatus in out-of-phase relationship to one another, and in synchronized constant relationship to movement of the bobbin conveyor component of the apparatus, together with retaining means for preventing discharge of a bobbin from the orienting device except when the second transporting means is in a bobbin receiving position adjacent the orienting device. In a preferred embodiment of the apparatus of the invention the retaining means comprises a platform-like member secured to and movable with the second transporting means, and underlying the discharge outlet of the orienting device except when the second transporting means is in a bobbin receiving position beneath such outlet. The apparatus of the invention preferably also includes improved means for transporting bobbins from the supply source to the orienting device, which improved means comprises a cradle-like member having an underlying bobbin supporting member movable both with and relative to the cradle-like member. The supporting member is biased to a bobbin supporting position which it occupies while the cradle-like member receives a bobbin from the supply source and while it transports the bobbin toward the orienting device. When the cradle-like member reaches the orienting device, abutment means then engagable with the supporting member moves it relative to the cradle-like member, against the biasing force imposed thereon, so as to permit passage of the transported bobbin from the cradle-like member and into the orienting device.

The bobbin feeding method of the invention includes the step of restraining discharge of bobbins from the bobbin orienting device when the oriented-bobbin transporting means is in a position other than a bobbin receiving position adjacent the orienting device, and the step of discharging an oriented bobbin from the orienting means in response to movement of such transporting means to its bobbin receiving position. Additionally, the two bobbin transporting means are preferably moved toward and away from the orienting device in out-of-phase relationship to each other, such that while a bobbin is undergoing orientation within the orienting device, a previously oriented bobbin is being transported from such device and the procurement of an unoriented bobbin, to be next introduced into the device, has commenced.

DESCRIPTION OF THE DRAWINGS

Other features and benefits of the invention will be in part apparent and in part pointed out specifically hereinafter in the following description of illustrative embodiments thereof, which description should be read in conjunction with the accompanying drawings, in which.

DESCRIPTION OF THE PREFERRED EMBODIMENTS

Figure 1:
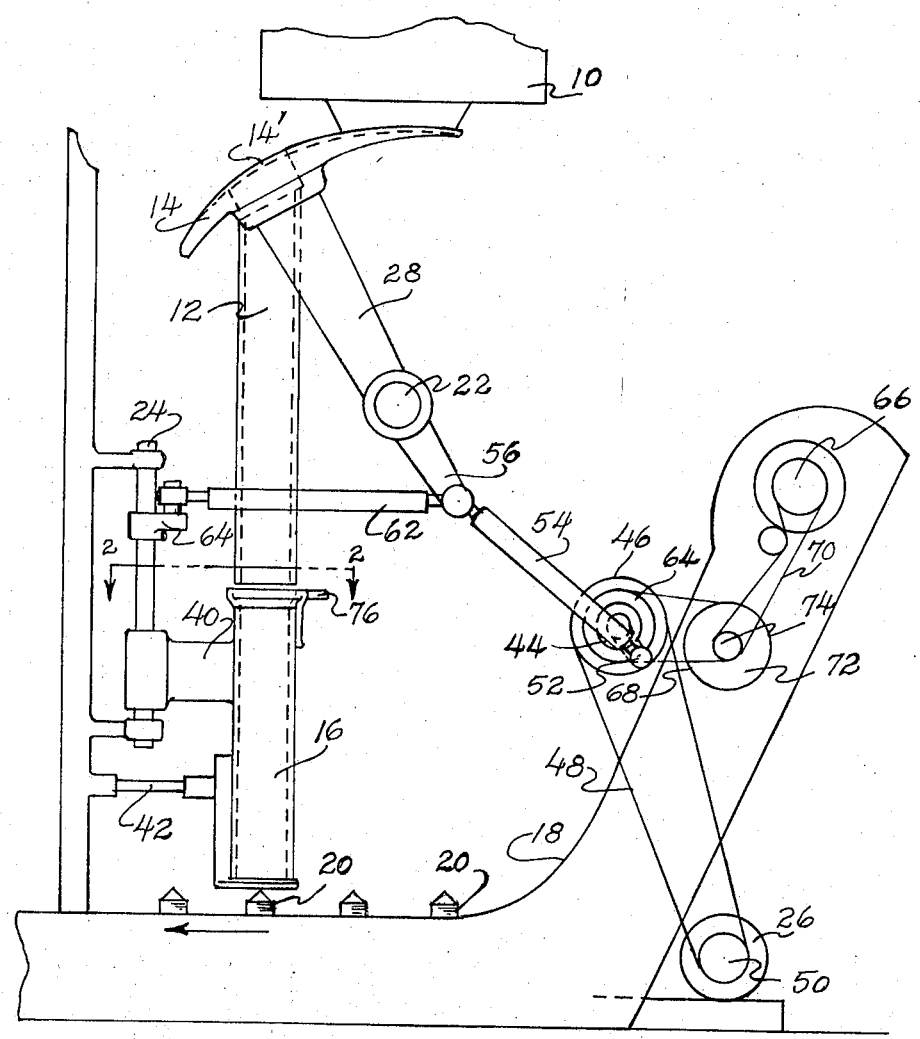
FIG. 1 is a partially schematic side elevational view of bobbin feeding apparatus embodying the invention, in association with an automatic doffer for a textile spinning frame, fragmentary parts of which are also shown.

Referring more particularly to the drawings, the bobbin orienting and loading apparatus is shown in FIG. 1 in association with an automatic doffer for a textile spinning frame or like machine (otherwise not shown), and generally comprises a bobbin supply source in the form of a hopper 10; bobbin orienting means in the form of a generally funnel shaped device 12; first bobbin transporting means including a cradle-like member 14 movable between hopper 10 and orienting device 12 for transporting unoriented bobbin tubes, one at a time and while extending generally horizontally, from hopper 10 to the open upper inlet end of device 12; second bobbin transporting means including a cage-like member 16 movable between the lower or outlet end of orienting device 12 and a bobbin loading station disposed distal from device 12 and adjacent the path of travel of a belt-type conveyor 18 having upstanding bobbin receiving pegs 20 thereon, for transporting bobbins discharged from device 12, in an oriented upright condition, one at a time from device 12 to the aforesaid loading station; means including shafts 22,24 respectively mounting members 14,16 for their aforesaid movements; drive means including a motor 26 for imparting synchronized uniform movement to members 14,16 and conveyor 18 in such a manner that members 14,16 are moved toward and away from orienting device 12 in out-of-phase relationship to each other; and retaining means for preventing discharge of a bobbin from orienting device 12 except when member 16 is in a bobbin receiving position adjacent the outlet of device 12.

Except as hereinafter noted, hopper 10, orienting device 12 and cradle-like member 14 may be and preferably are of the general constructions disclosed in commonly-assigned U.S. Pat. No. 3,601,283. Thus, cradle 14 has an elongate slot 14 (see FIG. 4) therein and is mounted by and atop a frame 28 for pivotal movement about the axis of shaft 22 between a bobbin-receiving first position, shown in FIG. 4 and wherein slot 14' is disposed beneath an opening in the bottom of hopper 10 so as to receive a single horizontally-extending bobbin-tube (not shown) therefrom, and a bobbin-discharging second position, shown in FIG. 1, wherein slot 14' overlies the bobbin-receiving inlet end of orienting device 12. Further in keeping with the construction disclosed in Pat. No. 3,601,283, and also in commonly-assigned U.S. Pat. No. 3,531,016, cam means (not shown) may if desired be provided in association with the aforesaid components to insure that tapered bobbin-tubes conducted to and passing by gravity through device 12 are discharged therefrom not only in an upright orientation, but additionally have their base ends lowermost. However, the present apparatus differs from that of the aforesaid patents in its provision of improved means, shown in FIGS. 4 and 5, for underlying and supporting the bobbin tubes while the same are being transported by cradle 14 from hopper 10 and to device 12.

Figure 4:
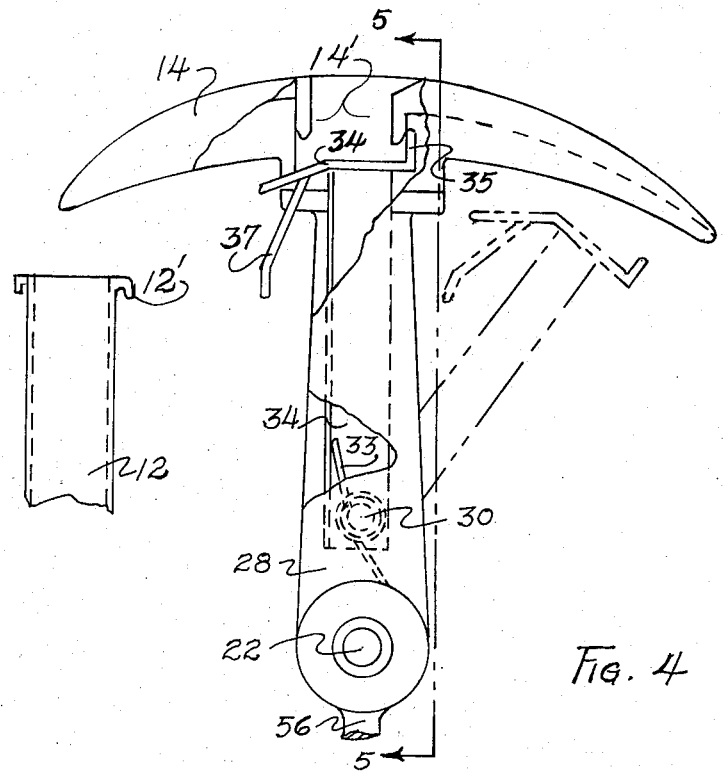
FIG. 4 is an enlarged fragmentary side elevational view of the upper end of the bobbin orienting device and of the cradle-like member which transports bobbins thereto, the latter being shown in its bobbin receiving position and being partially broken away to disclose details of an improved bobbin supporting member associated therewith.
Figure 5:
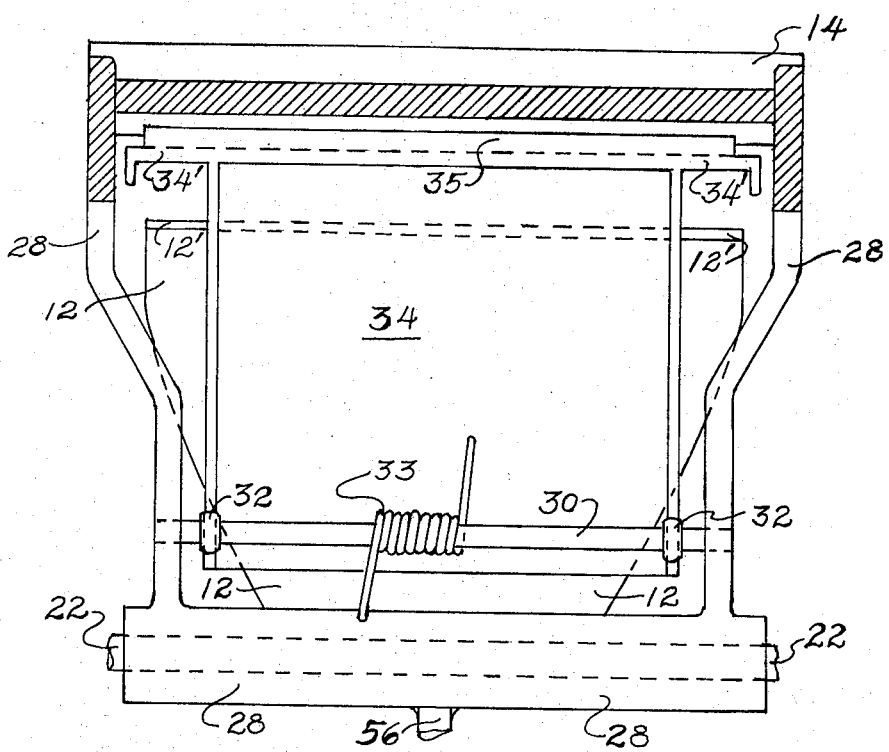
FIG. 5 is an elevational view, partially in vertical section taken substantially along the lines 5—5, of the components of FIG. 4.

Referring now particularly to FIGS. 4 and 5, a shaft 30 extends between and is carried by the upstanding arms of the frame 28 mounting cradle 14 for pivotal movement about the axis of shaft 22. A bobbin supporting member 34 is mounted by upstanding side flange portions thereof and suitable bearings 32,32' for pivotal movement about shaft 30 relative to cradle member 14 between a first position, illustrated in solid lines in FIG. 4, and a second position generally indicated by phantom lines in FIG. 4. In the aforesaid first position of member 34, the generally horizontally-extending upper end portion 34' thereof closely underlies slot 14' of cradle 14 so as to then support a bobbin within slot 14', and an upstanding flange 35 carried by or formed integrally with the rear edge of portion 34' is in abutting relationship with an adjacent portion of cradle member 14. Member 34 is biased toward and normally maintained in its aforesaid first position by biasing means, illustratively in the form of a coil spring 33 mounted upon shaft 30 and having its opposite ends in engagement with frame 28 and member 14, which biasing means urges member 14 in a counter clockwise direction as viewed in FIG. 4. However, displacement of member 34 from its first and to its second position relative to member 14 occurs as member 34 is moved to its bobbin-discharging position shown in FIG. 1, such that when slot 14' of member 14 is in vertical alignment with the inlet of orienting device 12, upper end portion 34' of member 34 is displaced from beneath slot 14' and any bobbin within the slot will therefore pass into device 12. The aforesaid displacement of member 34 to its second position is caused by engagement between abutment means illustratively in the form of a rolled upper edge 12' of orienting device 12 (see FIG. 4) and a flange 37 carried by or formed integrally with upper portion 34' of member 34 and extending angularly downwardly and outwardly from the under surface of a forward projection thereof. It will be apparent that except when cradle member 14 is immediately adjacent orienting device 12, member 34 moves in unison with member 14 and therefore presents a relatively-stationary support for any bobbin contained within slot 14' of member 14. Consequently, the present apparatus greatly reduces, if not altogether obviates, any tendency for erratic rotational or other movement to be imparted to a bobbin being transported from hopper 10 to orienting device 12.

Figure 2:
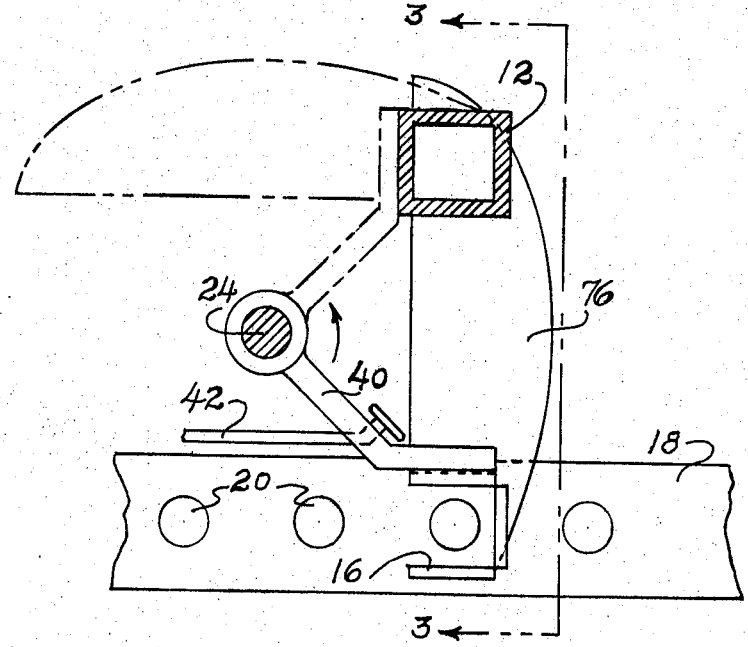
FIG. 2 is an enlarged top plan view, partially in horizontal section taken substantially along the lines 2—2 of FIG. 1, showing the bobbin retaining means and immediately adjacent components of the apparatus of FIG. 1.
Figure 3:
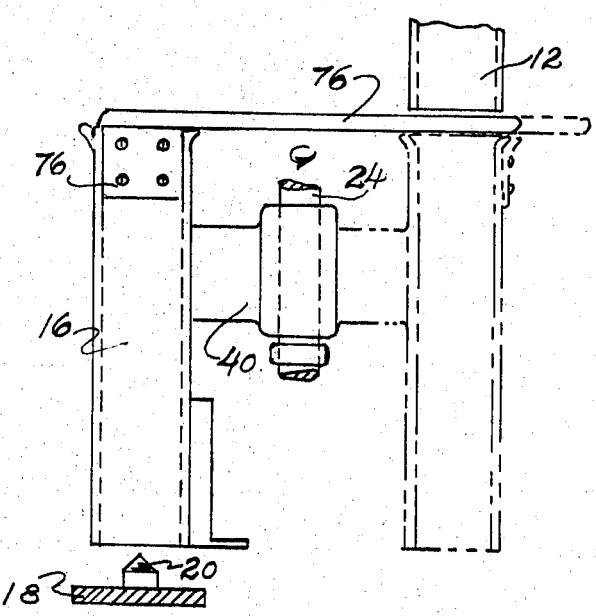
FIG. 3 is an elevational view of the components shown in FIG. 2.

Referring now particularly to FIGS. 1–3 of the drawings, cage-like member 16 is supported by vertically mounted pivot shaft 24 and an interconnecting arm 40 for pivotal movement with such shaft through an arc of approximately 90 degrees between a bobbin-receiving first position, shown in phantom lines in FIGS. 2 and 3, and a bobbin discharging second position shown in solid lines in FIGS. 1–3. In its bobbin-receiving first position, member 16 is disposed closely adjacent orienting device 12 with its flared open upper end directly underlying the outlet of device 12. In its bobbin discharging second postion, member 16 is disposed adjacent a bobbin loading station and directly overlies the conveyor 18 having thereon the pegs 20 upon which bobbins are to be loaded. Although other constructions may be employed, cradle member 16 and conveyor 18 are preferably of the constructions disclosed in commonly-assigned U.S. Pat. No. 3,698,536. As is more fully disclosed in such patent, engagement between member 16 and a "key" or abutment element 42 occurs upon movement of member 16 to its bobbin-discharging position. This in turn causes such a displacement of relatively movable sections of member 16 as to result in a bobbin within member 16 being then dropped therefrom on to an upstanding peg 20 positioned by movement of conveyor 18 beneath member 16. Alternative constructions of cage member 16 and conveyor 18, which might be employed in lieu of the aforesaid construction, are disclosed in commonly-assigned U.S. Pat. Nos. 3,603,440 and 3,601,283.

The drive means for imparting synchronous movement to cradle member 14, cage member 16 and conveyor 18 is schematically shown in FIG. 1 and includes a clutch 44 having an input sprocket 46 connected by a chain 48 to an output sprocket 50 of drive motor 26. When clutch 44 is engaged, by suitable control means (not shown) extending thereto, rotation of input sprocket 46 produces rotation of a crank arm 52 carried at the opposite end of clutch 44. A linkage member 54 pivotally interconnects crank arm 52 and a downwardly projecting lever-like part 56 of the frame 28 mounting cradle member 14 for pivotal movement about the axis of shaft 22. Another linkage 62 similarly interconnects frame 28 and a crank member 64 affixed to the shaft 24 supporting cage member 16. Rotation of crank arm 52 of clutch 44 therefore simultaneously produces pivotal movement of cradle member 14 about the axis of its supporting shaft 22 and pivotal movement of cage member 16 about the axis of its supporting shaft 24. Pursuant to the present invention, the aforesaid movements of members 14,16 are in out-of-phase relationship to one another, such that as one of the members 14,16 is moved toward orienting device 12, the other member 14,16 is moved away therefrom. Uniform movement of conveyor 18 in synchronized relationship to the movement of members 14,16 is realized through an output sprocket 64 provided on the same end of clutch 44 as input sprocket 46 and rotatable at all times in unison with input sprocket 46. Clutch output sprocket 64 is connected to a sprocket 66 upon a drive pulley of conveyor 18 by means of chains 68,70 and suitable intermediate sprockets 72,74. The sizes of the various sprockets 64,72,74 and 66 are such as to produce the desired synchronized speed relationship between conveyor 18 and members 14,16, when clutch 44 is in its engaged condition. Disengagement of clutch 44 permits members 14,16 to remain stationary while only conveyor 18 is driven by motor 26. This capability is desirable for reasons not material to the present bobbin feeding operation, during which clutch 44 is at all times maintained in an engaged condition such that members 14,16 and conveyor 18 are driven in synchronized relationship to one another at uniform speeds.

As previously noted, members 14,16 are driven toward and away from orienting device 12 in out-of-phase relationship to one another. Each bobbin introduced into orienting device 12 by cradle member 14 therefore reaches the lower outlet end of device 12 before cage member 16 fully returns to its bobbin receiving first position (shown in phantom lines in FIG. 3) beneath the outlet of device 12. The present invention therefore provides bobbin retaining means for preventing discharge of any bobbins from the outlet of device 12 except when cage member 16 is in its bobbin receiving first position beneath the outlet of such device. A preferred embodiment of such retaining means is disclosed in FIGS. 2 and 3, and comprises a platform-like plate member 76 bolted or otherwise suitably secured, as by a downwardly-projecting flange 76', to member 16 for movement in unison therewith. Member 76 extends generally horizontally from cage member 16 at or slightly above the elevation of the terminal flared upper end of member 16, and closely underlies the discharge outlet at the lower end of orienting device 12 at all times except when member 16 itself underlies such discharge outlet. A bobbin passing downwardly through device 12 and reaching the lower end thereof will engage and be supported by member 76 if cage member 16 is then not within its bobbin receiving position directly beneath the discharge outlet of device 12. Plate 76 will continue to support the bobbin as cage member 16 moves toward its bobbin receiving position, during which time relative sliding movement will occur between plate 76 and the lower end of the bobbin, and when member 16 reaches its bobbin receiving position the bobbin will fall freely from device 12 into the open upper end of member 16. In effect, therefore, plate 76 moves from a normally "closed" or bobbin restraining position to an "open" or bobbin discharging position in response to movement of member 16 to its bobbin receiving position.

In accordance with the preferred mode of operation, while each bobbin is undergoing orientation within orienting device 12, a previously oriented bobbin is being transported from such device by cage member 16 and the procurement of an unoriented bobbin, to be next introduced into device 12, has commenced with return movement of cradle member 14 back toward source 10.

It will be apparent that the speed of operation of the present apparatus is not limited by the time required for gravity passage of bobbins through device 12, and that high-speed operation of the apparatus is therefore possible. The provision of improved bobbin supporting means in association with cradle-member 14 also greatly lessens, if not altogether obviates, problems which might otherwise attend transporting of bobbins from hopper 10 to orienting device 12 during such high-speed operation.

While preferred embodiments of the invention have been specifically shown and described, it is to be understood that this was for purposes of illustration only, and not for purposes of limitation, the scope of the invention being in accordance with the following claims.

That which is claimed is:

1. In a bobbin orienting and feeding apparatus having bobbin orienting means for successively receiving unoriented bobbins through an inlet thereof and for discharging oriented bobbins through an outlet thereof, and bobbin transporting means movable between a bobbin receiving position adjacent said orienting means and a bobbin discharging position adjacent a bobbin-loading station distal from said orienting means for transporting oriented bobbins one at a time from said orienting means to said loading station, the improvement comprising:

bobbin retaining means responsive to movement of said transporting means for permitting discharge of oriented bobbins from said outlet of said orienting means when said transporting means is in said bobbin-receiving position thereof and for at other times restraining discharge of bobbins from said orienting means; said bobbin retaining means comprising a platform-like member mounted upon said transporting means in adjacent relationship to said outlet for movement in unison with said transporting means between a closed position wherein said member prevents discharge of bobbins through said outlet and an open position wherein said member permits discharge of bobbins through said outlet.

2. In a bobbin orienting and feeding apparatus having bobbin orienting means, a source of unoriented bobbins, first bobbin transporting means movable between a bobbin receiving first position adjacent said source and a bobbin discharging second position adjacent said orienting means for transporting unoriented bobbins one at a time from said source to said orienting means, second bobbin transporting means movable between a bobbin-receiving first position adjacent said orienting means and a bobbin discharging second position adjacent a bobbin loading station for transporting oriented bobbins one at a time from said orienting means to said loading station, the improvement comprising:

drive means for substantially simultaneously moving said first and second transporting means to said respective first positions thereof and for thereafter substantially simultaneously moving said first and second transporting means to said respective second positions thereof, during each cycle of operation of said apparatus;

and bobbin retaining means for retaining bobbins oriented by said orienting means thereat pending movement of said second transporting means to said first position thereof.

3. Apparatus as in claim 2, including movable conveyor means for receiving at said loading station bobbins transported thereto by said second transporting means, said drive means being operatively connected to said conveyor means for moving said conveyor means and said first and second transport means in synchronized relationship to each other during bobbin loading operation of said apparatus.

4. Apparatus as in claim 2, wherein said drive means comprises a drive motor, an engagable and disengagable clutch drivably connected to said motor, a first output member on said clutch operatively connected to said first and second transporting means for moving the same when said clutch is engaged, and a second output member on said clutch operatively connected to said conveyor for moving said conveyor irrespective of the engaged or disengaged condition of said clutch.

5. Apparatus as in claim 2, wherein said orienting means has a discharge outlet, and wherein said retaining means comprises an elongate plate-like member mounted upon and movable in unison with said second transporting means, said plate-like member extending from said second transporting means in blocking relationship to said discharge outlet of said orienting device except when said second transporting means is in said first position thereof.

6. Apparatus as in claim 2, wherein said first bobbin transporting means comprises a cradle-like member having an elongate slot therein adapted to receive each of said bobbins through the open top thereof from said source and to discharge each of said bobbins through the open bottom thereof into said orienting means, a bobbin supporting member associated with said cradle member, and means mounting said bobbin supporting member for movement with said cradle member and for movement relative to said cradle member between a first position wherein said supporting member underlies said slot so as to support a bobbin therein and a second position wherein said supporting member is displaced from beneath said slot of said cradle member so as to permit discharge of a bobbin therefrom.

7. In a bobbin feeding apparatus having a source of generally horizontally-extending bobbins, bobbin orienting means spaced from said source, and a cradle-like member movable between a bobbin receiving position adjacent said source and a bobbin discharging position adjacent said orienting means for transporting said bobbins one at a time from said source to said orienting means, said cradle member having an elongate slot therein adapted to receive each of said bobbins through the open top thereof from said source and to discharge each of said bobbins through the open bottom thereof into said orienting means, the improvement comprising:

a bobbin supporting member;

mounting means mounting said bobbin-supporting member for movement with said cradle member, and for movement relative to said cradle member between a first position wherein said supporting member underlies said slot of said cradle member so as to support a bobbin therein and a second position wherein said supporting member is displaced from said slot of said cradle member so as to permit discharge of a bobbin therefrom;

biasing means for biasing said supporting member to, and normally maintaining said supporting member in, said first position thereof;

and means for effecting relative movement of said supporting member to said second position thereof in response to movement of said cradle member to said bobbin discharging position thereof.

8. Apparatus as in claim 7, and further including a frame mounting said cradle member for said movement thereof, and wherein said supporting-member mounting means includes a shaft carried by and movable with said frame, said supporting member being mounted upon said shaft for pivotal movement relative thereto between said first and second positions thereof.

9. Apparatus as in claim 7, wherein said means for effecting said relative movement of said supporting member includes abutment means carried by said supporting member and by said orienting device for engagement therebetween when said cradle member is in said bobbin discharging position thereof.

10. Apparatus as in claim 7, and further including bobbin transporting means movable between a bobbin receiving position adjacent said orienting means and a bobbin discharging position distal from said orienting means for transporting oriented bobbins one at a time from said orienting means, and drive means connected to said cradle-like member and to said bobbin transporting means for moving the same substantially simultaneously to said respective bobbin receiving positions thereof and for thereafter moving the same substantially simultaneously to said respective bobbin discharging positions.

11. Apparatus as in claim 10, and further including bobbin retaining means for retaining bobbins oriented by said orienting means thereat pending movement of said bobbin transporting means to said bobbin receiving position thereof.

12. In the method of feeding bobbins in association with an apparatus having bobbin orienting means, a source of unoriented bobbins, first bobbin transporting means movable between a bobbin receiving first position adjacent said source and a bobbin discharging second position adjacent said orienting means for transporting unoriented bobbins one at a time from said source to said orienting means, second bobbin transporting means movable between a bobbin receiving first position adjacent said orienting means and a bobbin discharging second position distal from said orienting means for transporting oriented bobbins one at a time from said orienting means, the improvement comprising:

substantially simultaneously moving said first and second transporting means to said respective first positions thereof and thereafter substantially simultaneously moving said first and second transporting means to said respective second positions thereof, during each cycle of operation of said apparatus;

and retaining bobbins oriented by said orienting means thereat pending movement of said second transporting means to said first position thereof.

13. In the method of feeding bobbins in association with an apparatus having bobbin orienting means for successively receiving unoriented bobbins and discharging oriented bobbins, and bobbin transporting means movable between a bobbin receiving position adjacent said orienting means and a bobbin discharging position distal from said orienting means for transporting oriented bobbins one at a time from said orienting means, the improvement comprising:

restraining discharge of bobbins from said orienting means when said bobbin transporting means is in a position other than said bobbin receiving position thereof;

discharging an oriented bobbin from said orienting means in response to movement of said transporting means to said bobbin receiving position thereof; and introducing an unoriented bobbin into said orienting device substantially simultaneously with the discharging of an oriented bobbin from said device.

* * * * *

UNITED STATES PATENT AND TRADEMARK OFFICE
CERTIFICATE OF CORRECTION

PATENT NO. : 3,870,195
DATED : 11 March 1975
INVENTOR(S) : Lester W. Pray et al

Page 1 of 2

It is certified that error appears in the above-identified patent and that said Letters Patent are hereby corrected as shown below:

Cover page, the "References Cited" listing should read --

| | | | |
|---|---|---|---|
| 1,261,763 | 4/1918 | Cameron | 74/665 HX |
| 2,604,577 | 7/1952 | Strickland et al | 221/290 X |
| 3,269,594 | 8/1966 | McKenzie et al | 221/238 X |
| 3,379,048 | 4/1968 | Cooper et al | 221/293 X |
| 3,473,676 | 10/1969 | Cotney | 221/293 X |
| 3,601,283 | 8/1971 | Glazener et al | 221/264 -- . |

Sheet 2, Fig.3, the left-most numeral "76" should be -- 76' --.
Col. 4, line 20, the second numeral "14" should read -- 14' --.
Col. 5, line 66, "64" should read -- 41 --.

The drawing Figure on the cover sheet and Fig. 1 of the drawings should appear as shown on the attached sheet.

Signed and Sealed this

Twenty-eighth Day of December 1976

[SEAL]

Attest:

RUTH C. MASON
Attesting Officer

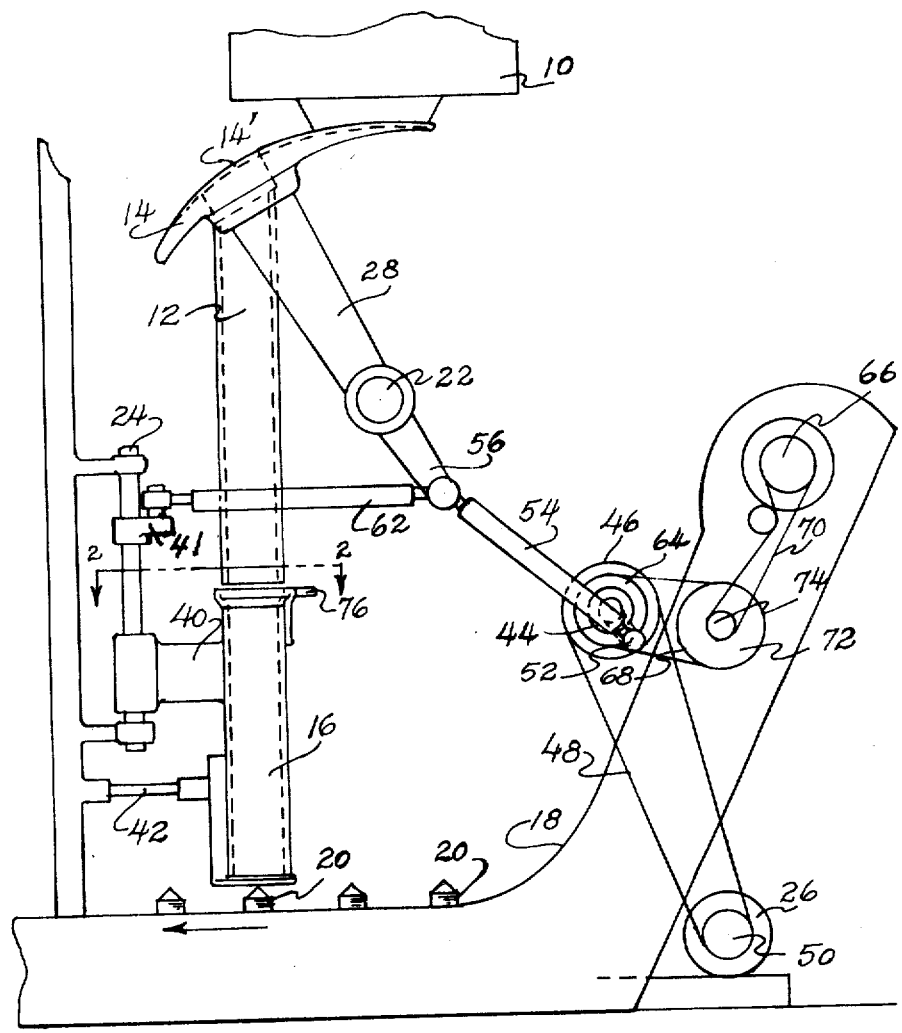

C. MARSHALL DANN
Commissioner of Patents and Trademarks